US008584755B2

(12) United States Patent
Willberg et al.

(10) Patent No.: US 8,584,755 B2
(45) Date of Patent: *Nov. 19, 2013

(54) METHOD FOR HYDRAULIC FRACTURING OF SUBTERRANEAN FORMATION

(75) Inventors: Dean M. Willberg, Tucson, AZ (US);
Matthew J. Miller, Katy, TX (US);
Marc Jean Thiercelin, Ville d'Avray (FR); Ivan Vitalievich Kosarev, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,297

(22) Filed: Nov. 18, 2011

(65) Prior Publication Data

US 2012/0125618 A1    May 24, 2012

Related U.S. Application Data

(63) Continuation of application No. 12/162,462, filed as application No. PCT/RU2006/000026 on Jan. 27, 2006, now Pat. No. 8,061,424.

(51) Int. Cl.
*E21B 43/267* (2006.01)

(52) U.S. Cl.
USPC ............ 166/280.2; 166/280.1; 166/281; 166/300

(58) Field of Classification Search
None
See application file for complete search history.

(56) References Cited

U.S. PATENT DOCUMENTS

| 4,143,715 A | 3/1979 | Pavlich |
| 4,186,802 A | 2/1980 | Perlman |
| 4,619,320 A | 10/1986 | Adnyana et al. |
| 4,657,784 A | 4/1987 | Olson |
| 4,980,960 A | 1/1991 | Usui et al. |
| 5,040,283 A | 8/1991 | Pelgrom |
| 5,054,554 A | 10/1991 | Pearson |
| 5,057,114 A | 10/1991 | Wittich et al. |
| 5,330,005 A | 7/1994 | Card et al. |

(Continued)

FOREIGN PATENT DOCUMENTS

EP    0360319    11/1992

OTHER PUBLICATIONS

The Impact of Non-Darcy Flow on Production from Hydraulically Fractured Gas Wells, Patrick Handren, C. Mark Pearson, John Kullman, CARBO Ceramics, Inc.; Robert J. Coleman, Chevron USA Production Company; Jay Foreman, Halliburton Energy Services; Keith Froebel, Jon Caron, Total-Fina-Elf. SPE Production and Operations Symposium, Mar. 24-27, 2001, Oklahoma City, Oklahoma.

(Continued)

*Primary Examiner* — George Suchfield
(74) *Attorney, Agent, or Firm* — Daryl R. Wright; Tim Curington; Robin Nava

(57) ABSTRACT

The invention provides economically effective methods for hydraulic fracturing a subterranean formation that ensure improvement of the hydraulic fracture conductivity because of forming strong proppant clusters uniformly placed in the fracture throughout its length. One of these methods comprises: a first stage comprising injection of fracturing fluid into a borehole, the fluid containing thickeners to create a fracture in the formation; and a second stage comprising introduction of proppant into the injected fracturing fluid to prevent closure of the created fracture, and further, comprising introducing an agent into the fracturing fluid to provide formation of proppant clusters in the created fracture and channels for flowing formation fluids.

19 Claims, 3 Drawing Sheets

(56) References Cited

U.S. PATENT DOCUMENTS

| | | |
|---|---|---|
| 5,501,275 A | 3/1996 | Card et al. |
| 5,505,740 A | 4/1996 | Kong et al. |
| 5,658,861 A | 8/1997 | Nelson et al. |
| 5,716,923 A | 2/1998 | MacBeath et al. |
| 5,908,073 A | 6/1999 | Nguyen et al. |
| 5,910,322 A | 6/1999 | Rivett et al. |
| 5,921,317 A | 7/1999 | Dewprashad et al. |
| 6,752,208 B1 | 6/2004 | Nguyen |
| 6,776,235 B1 | 8/2004 | England |
| 7,255,169 B2 | 8/2007 | van Batenburg et al. |
| 7,413,017 B2 | 8/2008 | Nguyen et al. |
| 7,541,318 B2 | 6/2009 | Weaver et al. |
| 7,581,590 B2 | 9/2009 | Lesko et al. |
| 8,061,424 B2 * | 11/2011 | Willberg et al. ........... 166/280.2 |
| 2004/0226715 A1 | 11/2004 | Willberg et al. |
| 2006/0113078 A1 | 6/2006 | Nguyen |
| 2006/0283591 A1 | 12/2006 | Willberg et al. |
| 2008/0113078 A1 | 5/2008 | Merkle et al. |

OTHER PUBLICATIONS

A Study of Two-Phase, Non-Darcy Gas Flow Through Proppant Pacs, L. Jin, SPE, Enron Global E&P Inc. and G.S. Penny, SPE, Stim-Lab Inc., SPE Production & Facilities, vol. 15, No. 4 pp. 247-254, Nov. 2000.

Experimental Study of Hydraulic Fracture Conductivity Demonstrates the Benefits of Using Proppants, C.N. Fredd, S.B. McConnell, C.L. Boney, K.W. England, Schlumberger Oilfield Services, SPE Rocky Mountain Regional/Low-Permeability Reservoirs Symposium and Exhibition, Mar. 12-15, 2000, Denver, Colorado.

Reservoir Stimulation 3rd M.J. Economides, K.J. Nolte, Editors John Wiley and Sons, New York, 2000, pp. 5-1-5-28.

* cited by examiner

METHOD FOR HYDRAULIC FRACTURING OF SUBTERRANEAN FORMATION

This application claims priority as a continuation application of U.S. patent application Ser. No. 12/162,462, filed Jul. 28, 2008, which is a U.S. National Phase application of PCT/RU2006/000026, filed Jan. 27, 2006. The disclosures of each of the priority applications are incorporated by reference herein in their entirety.

TECHNICAL FIELD

This invention relates hydraulic fracturing in subterranean formations and, more particularly, to methods for optimizing fracture conductivity.

BACKGROUND

Hydrocarbons (oil, natural gas, etc.) are obtained from a subterranean geological formation by drilling a well that penetrates the hydrocarbon-bearing formation. This provides a partial flowpath for the hydrocarbon to reach the surface. In order for the hydrocarbon to be "produced," that is, travel from the formation to the wellbore and ultimately to the surface, there must be a sufficiently unimpeded flow path.

Hydraulic fracturing is a primary tool for improving well productivity by placing or extending highly conductive fractures from the wellbore into the reservoir. During the first stage, hydraulic fracturing fluid is injected through wellbore into a subterranean formation at high rates and pressures. The fracturing fluid injection rate exceeds the filtration rate into the formation producing increasing hydraulic pressure at the sandface. When the pressure exceeds a critical value, the formation strata or rock cracks and fractures. The formation fracture is more permeable than the formation porosity.

During the next stage, proppant is deposited in the fracture to prevent it from closing after injection stops. The resulting propped fracture enables improved flow of the recoverable fluid, i.e., oil, gas or water. Sand, gravel, glass beads, walnut shells, ceramic particles, sintered bauxites and other materials may be used as a proppant.

Hydraulic fracturing fluids are aqueous solutions containing a thickener, such as a solvatable polysaccharide, to provide sufficient viscosity to transport the proppant. Typical thickeners are polymers, such as guar (phytogeneous polysaccharide), and guar derivatives (hydropropyl guar, carboxymethylhydropropyl guar). Other polymers can be used also as thickeners. Water with guar represents a linear gel with a viscosity proportional to the polymer concentration. Crosslinking agents are used which provide engagement between polymer chains to form sufficiently strong couplings that increase the gel viscosity and create visco-elasticity. Common crosslinking agents for guar include boron, titanium, zirconium, and aluminum.

Proppant-retention agents are commonly used during the latter stages of the hydraulic fracturing treatment to limit the flowback of proppant placed into the formation. For instance, the proppant may be coated with a curable resin activated under downhole conditions. Different materials, such as bundles of fibers, or fibrous or deformable materials, also have been used to retain proppants in the fracture. Presumably, fibers form a three-dimensional network in the proppant, reinforcing it and limiting its flowback.

The success of a hydraulic fracturing treatment depends upon hydraulic fracture conductivity and fracture length. Fracture conductivity is the product of proppant permeability and fracture width; units are typically expressed as millidarcy-feet. Fracture conductivity is affected by a number of known parameters. Proppant particle size distribution is one key parameter that influences fracture permeability. The concentration of proppant between the fracture faces is another (expressed in pounds of proppant per square foot of fracture surface) and influences the fracture width. One may consider high-strength proppants, fluids with excellent proppant transport characteristics (ability to minimize gravity-driven settling within the fracture itself), high-proppant concentrations, or big proppants as means to improve fracture conductivity. Weak materials, poor proppant transport, and narrow fractures all lead to poor well productivity. Relatively inexpensive materials of little strength, such as sand, are used for hydraulic fracturing of formations with small internal stresses. Materials of greater cost, such as ceramics, bauxites and others, are used in formations with higher internal stresses. Chemical interaction between produced fluids and proppants may change significantly the proppant's characteristics. Thus, one should also consider the proppant's long-term ability to resist crushing because oil and gas wells typically operate for several years.

The proppant pack must create a layer having a higher hydraulic conductivity than the surrounding formation rock. The proppant pack within the fracture can be modeled as a permeable porous structure, and the flow of formation fluids through this layer is generally described using the well-known Darcy's law (1) or Forscheimer's equation (2):

$$\partial P/\partial x = -(\mu u/k); \qquad (1)$$

$$\partial P/\partial x = -[(\mu u/k) + \beta \rho u^2], \qquad (2)$$

where
P is a fluid pressure in the fracture;
x is a distance along the fracture from the wellbore;
$\mu$ is a viscosity of the formation fluid;
u is a flow (filtration) speed of the formation fluid;
k is a permeability of the proppant pack;
$\beta$ is a coefficient referred to as beta-factor that describes non-linear corrections to the Darcy's filtration law;
$\rho$ is a density of the formation fluid.

The result of multiplying fracture permeability by fracture width is referred to as "hydraulic conductivity". The most important aspect of fracture design is optimization of the hydraulic conductivity for a particular formation's conditions. Fracture design theory and methodology are sufficiently well described in several scientific articles and monographs. *Reservoir Stimulation*, 3$^{rd}$ ed. Economides, Michael J. and Nolte, Kenneth G., John Wiley and Sons (1999) is a good example of a reference that provides good fracture design methodology.

A fracture optimization process will strike a balance among the proppant strength, hydraulic fracture conductivity, proppant distribution, cost of materials, and the cost of executing a hydraulic fracturing treatment in a specific reservoir. The case of big proppants illustrates compromises made during an optimization process. A significant hydraulic fracture conductivity increase is possible using large diameter proppants. However, large diameter proppants at a given internal formation stress crush to a greater extent when subjected to high fracture closure stresses, leading to a decrease in the effective hydraulic conductivity of the proppant pack. Further, the larger the proppant particles, the more they are subjected to bridging and trapping in the fracture near the injection point.

A particular proppant is selected based on its ability to resist crushing and provide sufficient fracture conductivity upon being subjected to the fracture closure stress; and its ability to flow deeply into the hydraulic fracture—cost effectively. Proppants are second after water according to volume and mass used during the hydraulic fracturing process. Ceramic proppant has superior beta-factors and more strength compared to sand. However, the cost of ceramic proppants is many fold higher than the cost of sand. Therefore, fracture conductivity improvement requires significant costs for hydraulic fracturing with proppant typically representing 20 to 60 percent of the total for a conventional hydraulic fracturing process.

Apart from the above considerations, there are other proppant characteristics that complicate the production of hydrocarbons. First, formation fluids often bypass a large fraction of the fluid used in the treatment. (The fluid remaining in the proppant pack damages the conductivity of the fracture.) Field studies have shown that the recovery of hydraulic fracturing fluid from fractures in natural gas wells averages only 20 to 50 percent of that injected during the treatments and can be much less. Probably formation fluids flow only along several channels in the form of "fingers" within the proppant pack, or only through that part of the proppant pack near the wellbore during the fracture clean-up process. The fracture portion containing residual viscous gel hinders fluid flow, thereby reducing effective hydraulic fracture conductivity. Lowering the fracturing fluid viscosity after the treatment is an effective way to increase the fracturing fluid recovery from the proppant pack porosity. The addition of substances called "breakers" promotes gel viscosity reduction. Breakers act by several mechanisms, but most commonly they function by cleaving polymer chains to decrease their length and, thereby, to reduce the polymer solution viscosity. Different breakers are characterized by such parameters as the rate of reaction between the breaker and the polymer, and the activation or deactivation temperatures of the specific breaker in question. Better fracture cleanup can be achieved using high breaker concentrations, but too high a breaker concentration can result in a premature gel viscosity reduction, which may compromise the treatment design and cause premature treatment completion—a screen out. Delayed action breakers, such as encapsulated, were developed to solve this problem. Encapsulated breakers are active breaker chemicals, such as oxidizer granules, coated by protective shells, which isolate the oxidizer from the polymer and delay their reaction. Shell destruction and breaker release take place through various mechanisms, including the action of mechanical stresses occurring at fracture closure. Encapsulated breakers enable higher breaker concentrations to be used in the hydraulic fracturing fluid and, therefore, increase the extent of fracture cleaning.

Another factor reducing fracture conductivity is pore clogging in the proppant pack by formation particles formed during the fracturing process, by proppant particles formed by proppant crushing; and by immiscible fluids (The Impact of Non-Darcy Flow on Production from Hydraulically Fractured Gas Wells, SPE Production and Operations Symposium, 24-27 March, Oklahoma City, Okla., 2001; A Study of Two-Phase, Non-Darcy Gas Flow Through Proppant Pacs, SPE Production & Facilities, Volume 15 Number 4 November, 2000). So, evidently, a fracture in which formation fluids flow through a created channel network instead of through small pores in the proppant pack could improve the fracture's hydraulic conductivity by several mechanisms: reduced inertial losses, improved fracturing fluid clean up, reduction of capillary forces that impose significant two-phase flow pressure losses, and elimination of pore throat plugging by the capture of formation fines and crushed proppant fragments.

In recent years, fracturing treatments in many low permeability formations in North America were pumped using low viscosity hydraulic fracture fluids that were proppant-free or with only a small amount of proppant. This method has several names, the most common of which is "waterfrac". Fractures created by the waterfrac process are practically proppant-free. It is anticipated that the created fracture surfaces shift relative to each other during fracture creation and propagation. The resulting misalignment of irregular surface features (asperities) prevents the two fracture faces from forming a tight seal upon closure. Adding a small amount of proppant reportedly intensifies the effect of irregular and misaligned crack surfaces. However, due to poor transport, the proppant tends to accumulate below the casing perforations, most likely along the base of the created hydraulic fracture. This accumulation occurs due to a high rate of proppant settling in the fracturing fluid along a narrow hydraulic fracture, and insufficient proppant transport ability, (both because of low fracturing fluid viscosity). When fracturing fluid injection stops at the end of a waterfrac, the fracture immediately shortens in length and height. This slightly compacts the proppant, which remains as a "dune" at the fracture base near the wellbore. Because of the dune's limited length, width and, typically, strength (often low-strength sand is used), waterfracs are usually characterized by short, low-conductivity fractures (Experimental Study of Hydraulic Fracture Conductivity Demonstrates the Benefits of Using Proppants, SPE Rocky Mountain Regional/Low-Permeability Reservoirs Symposium and Exhibition, 12-15 March, Denver, Colo., 2000).

The previous discussion illustrates that waterfracs result from the passage of formation fluid flowing through the network of narrow channels created inside of the fracture due to incomplete closure caused by surface rock imperfections, i.e. the waterfrac process results in low conductivity fractures. One method of improving hydraulic fracture conductivity is to construct proppant clusters in the fracture, as opposed constructing a continuous proppant pack. U.S. Pat. No. 6,776, 235 discloses a method for hydraulically fracturing a subterranean formation involving: an initial stage of injecting hydraulic fracturing fluid into a borehole, the fluid containing thickeners to create a fracture in the formation; and alternating stages of periodically introducing into the borehole proppant-containing hydraulic fracturing fluids contrasting in their abilities to transport propping agents and, therefore, contrasting in proppant-settling rates to form proppant clusters as posts that prevent fracture closing. This method alternates the stages of proppant-laden and proppant-free fracturing fluids. The amount of proppant deposited in the fracture during each stage is modulated by varying the fluid transport characteristics (such as viscosity and elasticity), the proppant densities, diameters, and concentrations and the fracturing fluid injection rate.

This patent's methods provide creation of proppant clusters, or islands, in the fracture and channels between them for formation fluids to flow. However, periodic injection of the proppant used in the present method involves transportation of each portion of proppant, first, down through the well; then, through perforations of the casing string into a fracture; and, further, through the fracture along its length. Since proppant-containing and proppant-free fracturing fluids have different specific gravities, the proppant-containing fluid can settle, or underride, the proppant-free fluid. Such settling results in non-uniform distribution of proppant clusters in the fracture.

SUMMARY

The term "proppant" as normally used refers to a granular material mixed into a fracturing fluid and pumped into the well bore during the hydraulic fracturing treatment. This proppant forms a porous bed, permeable by formation fluids, resists formation closure and keeps the fracture face separated after treatment completion. In conventional treatments, skilled workers can select from several types of granular materials providing the desired permeability (hydraulic conductivity) for the best price at the given formation's closure stress. Common proppants are high-grade, highly-classified quartz sands; aluminosilicate ceramic, sintered bauxite, and silicate ceramic beads; and types of materials coated with various organic resins. Proppants manufactured from walnut shells, glass beads, and organic composites have also been pumped. One of the most important factors in proppant selection is size distribution of individual grains. All other things being equal, proppants that have a narrow size distribution in the fracture will have a higher permeability than an equivalent proppant with the same mean particle size, but a broader proppant distribution.

These standard conventions regarding the selection and use of proppants don't apply to the invention described here. In this patent application, the term proppants and/or propping materials is defined as "any solid material, granular, fibrous or otherwise, that is added to the fracturing fluid to create a robust and stable structure within the fracture. As such, all commonly recognized conventional proppants are still considered proppants with respect to this invention. However, other materials, such as widely classified sand, metallic ribbons and needles, disks, abrasive granules, organic and inorganic fibers, also are considered proppants and/or propping materials as far as this invention is concerned.

The term "fiber" is often used in the following invention description and claims. For the purposes of this invention, the term "fiber" refers to any material or physical body in which the length ratio between any one of the three spatial dimensions exceeds that of either one, or both of the other two dimensions, by a factor of 5:1. This means a body aspect ratio of greater than 5:1. Therefore, what is commonly perceived as a fiber is a fiber as far as this invention is concerned. Likewise, that which is commonly referred to as a ribbon or plate, is by definition a fiber as far as this invention is concerned.

This invention provides an economically effective method for hydraulic fracturing of a subterranean formation with a fracture having high hydraulic conductivity for formation fluids. This invention creates strong proppant clusters or islands distributed through much of the fracture surface area, which prevent the closure of the fracture walls after treatment completion. The channels and open regions formed between these islands and clusters, and kept open by such clusters, contain a sufficiently large cross-section for formation fluids to flow.

Normally a hydraulic fracturing treatment is executed as a sequence of two or more staged events. During the first stage of most fracturing treatments, commonly referred to as "The Pad", a water- or oil-based fluid is pumped into the formation at sufficiently high pressures and rates to create the hydraulic fracture. Often the fluid is viscosified during this stage using various thickening agents; and a skilled worker can control the viscosity to influence the fracture's final geometry. The invention described here employs such a pad stage.

Immediately and usually continuously following the pad stage is the main stage of the fracture commonly referred to as the "Propped Stage". During a conventional treatment this stage usually involves the pumping of a fluid containing either a constant or increasing concentration of conventional proppants. This creates a porous bed of material at the end of the treatment. Skilled workers know how to select the appropriate proppants for given formation conditions to maximize the fracture's hydraulic conductivity. In conventional treatments, the "propped stage" is usually pumped until treatment completion. Often the end of the "propped stage" is called the "tail-in" stage. During the "tail in" stage resin coated proppant and/or fibers are added as a means of controlling proppant flowback subsequent to the treatment.

In contrast, in this invention the propped stage consists of a sequence of alternating sub-stages, some of which involve propping material, hereinafter referred to as the "propping sub-stage"; and some of which involve the carrier fluid, hereinafter referred to as the "carrier sub-stage". At least one sub-stage containing propping materials and one sub-stage without will be pumped into the fractures. The propping sub-stages are sized and composed in such a way that propping material aggregates form high-strength pillars and islands that prevent fracture closure and form channels for flowing formation fluids between the clusters. Since the fracture's hydraulic conductivity is through open channels, one part of this invention allows for propping materials composition to be selected to optimize the compressive strength and erosion resistance of the resulting island for the given reservoir conditions. The permeability of the resulting cluster or island is either irrelevant or of secondary importance.

Another aspect of this invention is that the sub-stages containing propping materials may contain additional reinforcing and consolidation materials that increase the former proppant clusters. Reinforcement and consolidation means any chemical and/or physical process that is used to increase the adhesion of particulate material together; or that is used to increase the frictional forces holding the particles together; or that mechanically restrains the particles from separating when acted upon by some external force. Specific examples of reinforcements could be fibers (particles with aspect ratios greater than 5:1), deformable materials, and resin coating on the surface of the particles that can cause these particles to stick together.

In many cases it may be advantageous to introduce the reinforcing material while the proppant is introduced into the fracturing fluid, although the reinforcing material can be introduced into the fluid continuously.

The reinforcing material may represent: organic, inorganic, or organic and inorganic fibers. These fibers may also be treated or manufactured to include an adhesive coating alone, or an adhesive coating coated by a layer of non-adhesive substance that dissolves in the fracturing fluid as it flows through the fracture. The reinforcing material may also be metallic particles with spherical or elongated shapes; plates of organic or inorganic substances; ceramics, metals or metal alloys disk-shaped in diameter; or rectangular shaped in length and width, that for all of these materials the ratio between any two of the three dimensions is greater than 5 to 1.

Preferably, the second stage further involves introducing an agent into the fracturing fluid that increases its proppant suspension capability. This agent may be a material with elongated particles with much greater length than diameter.

Elongated particles can be introduced simultaneously with proppant into the fracturing fluid or separately, i.e. intermittently continuously.

Preferably, the elongated particles are more than 2 mm long with a diameter of 3-200 µm.

Proppant particles may have an adhesive coating alone or an adhesive coating coated by a layer of non-adhesive substance that dissolves in the fracturing fluid as it flows through the fracture.

Under some formation conditions it may be advantageous when using the method above to perform a final tail-in stage of the fracturing treatment involving continuous proppant introduction into the fracturing fluid, with the proppant at this stage of essentially uniform particle size. At the same time, it is possible to introduce into the fracturing fluid a reinforcing material and/or a material with elongated particles that increases its proppant suspension capability.

The Second Embodiment

Another method can be used to accomplish high-conductivity fractures formed by constructing distributed proppant pillars for hydraulic fracturing of a subterranean formation. This second embodiment involves a first stage during which a fracturing fluid containing thickeners is injected into a borehole (the pad stage); and a second stage during which proppant is continuously added into the injected fracturing fluid (and thus into the created fracture) to prevent fracture closure. In this invention, the second stage further involves periodic introduction of an agent into the fracturing fluid to promote formation of proppant clusters in the created fracture. Open channels through which formation fluids flow separate the proppant clusters.

To form the proppant clusters, the agent reacts with the fracturing fluid after a specific time interval based on how much time elapsed from the moment of the agent's introduction into the fracturing fluid. This time interval is monitored and varied during the treatment to trigger a reaction between the agent and the fracturing fluid in different places of the created fracture. Clusters formed as a result of this reaction will also be distributed throughout the fracture. The reaction delay is achieved by one of many different mechanisms including but not limited to the following: variation of the agent's chemical composition; encapsulation of the agent within shells that dissolve in the fracturing fluid; erosion of the shells from collisions with other agent particles and the fracture surface; crushing the shells between the fracture walls upon closure; encapsulation of the agent into semi-permeable shells that swell and rupture in the fracturing fluid; encapsulation of the agent into a semi-membrane or porous shell that allows for slow diffusion of the agent into the fracturing fluid; and encapsulation of the agent into a shell capable of dissolving or washing away.

This agent may be an additive that provides a drastic and significant local decrease in the fracturing fluid viscosity, after which the proppant entrained within that newly broken fluid will settle or jam between the fracture faces.

The additives may be fracturing fluid breakers that react upon controlled release within the fracture. The fracturing fluid breaker may be an oxidizer, an enzyme, a chelant (of the crosslinker), or a chemical that can change the fluid pH to a level at which the crosslinks or the polymer backbone is unstable. The result in any case is a breaker that reacts with the fracturing fluid and results in significant fracturing fluid viscosity reduction. A catalyst may be introduced into the fracturing fluid to increase the reaction rate of the breaker to the fracturing fluid if desired.

The additives may also be of a class that destroys the fracturing fluid cross-linker such as but not limited chelating agents, EDTA and NTA for zirconate crosslinkers, and sorbitol and polyvinylalcohol for borate crosslinkers. These additives may be encapsulated with shells of various thicknesses or release mechanisms the release the additives in various places of the fracture. Encapsulated or delayed release acids and or bases can also be used.

The agent that initiates proppant cluster formation in the fracture may be an additive that reduces the mobility of proppant particles. An example is fiber bundles coated in a material whose dissolution in the fracturing fluid provides hydration and dispersion of fibers and increases their concentration. These additives may also be materials that return to their initial shape when heated to a certain temperature, such as fibers twisted into balls that straightened or increase their volume when heated.

The additives may be materials with high absorption capacity. Particles of high absorption capacity may be coated by a shell that dissolves during passage through the fracture, or during fracturing fluid temperature elevation, or a combination of these conditions.

The additives may be granules, fibers, or plates whose surfaces become adhesive at formation temperatures. These elements may have an adhesive surface and be coated by a layer of a non-adhesive substance that dissolves in the fracturing fluid.

The Third Embodiment

According to another invention embodiment, a method for hydraulic fracturing of a subterranean formation involves: a first stage, during which fracturing fluid containing thickeners is injected into a borehole (the pad); and a second stage, during which proppant is continuously introduced into the injected fracturing fluid into a created fracture to prevent its closure. Further, the method includes a third stage during which a low-viscosity liquid is injected into the fracturing fluid. This liquid—owing to a difference between its viscosity and that of the fracturing fluid—penetrates into the fracturing fluid as intrusions that divide the proppant into discrete clusters and form channels between them for formation fluids to pass.

Similar to the method in the first embodiment, the second stage in the second and third embodiments may include introduction of a material with elongated particles and/or a reinforcing material, and use of a proppant with these same properties. At the same time, an additional final stage is possible involving continuous introduction into the fracturing fluid of a proppant with essentially uniform particle size, and a reinforcing material and/or a material having elongated particles.

BRIEF DESCRIPTION OF THE DRAWINGS

The following drawings accompany the invention's description.

DETAILED DESCRIPTION OF PREFERRED EMBODIMENTS OF THE INVENTION

In the first embodiment of this invention, a hydraulic fracturing method for a subterranean formation, the first stage, here-and-after referred to as the "pad stage" involves injecting a fracturing fluid into a borehole at a sufficiently high flow rate that it creates a hydraulic fracture at the sand face. The pad stage is pumped until the fracture is of sufficient dimensions to accommodate the subsequent slurry pumped in the proppant stages. The volume of the pad can be designed by those knowledgeable in the art of fracture design (Reservoir Stimulation 3$^{rd}$ Ed. M. J. Economides, K. G. Nolte, Editors, John Wiley and Sons, New York, 2000).

Water-based fracturing fluids are common with natural or synthetic water-soluble polymers added to increase fluid viscosity and are used throughout the pad and subsequent propped stages. These polymers include, but are not limited to, guar gums; high-molecular-weight polysaccharides composed of mannose and galactose sugars; or guar derivatives, such as hydropropyl guar, carboxymethyl guar, and carboxymethylhydropropyl guar. Cross-linking agents based on boron, titanium, zirconium or aluminum complexes are typically used to increase the polymer's effective molecular weight making it better suited for use in high-temperature wells.

To a small extent, cellulose derivatives, such as hydroxyethylcellulose or hydroxypropylcellulose and carboxymethylhydroxyethylcellulose, are used with or without cross-linkers. Two biopolymers—xanthan and scleroglucan—prove excellent proppant-suspension ability, but are more expensive than guar derivatives and so are used less frequently. Polyacrylamide and polyacrylate polymers and copolymers are used typically for high-temperature applications or as friction reducers at low concentrations for all temperatures ranges.

Polymer-free, water-base fracturing fluids can be obtained using viscoelastic surfactants. Usually, these fluids are prepared by mixing in appropriate amounts of suitable surfactants, such as anionic, cationic, nonionic and Zwiterionic. The viscosity of viscoelastic surfactant fluids are attributed to the three-dimensional structure formed by the fluid's components. When the surfactant concentration in a viscoelastic fluid significantly exceeds a critical concentration, and in most cases in the presence of an electrolyte, surfactant molecules aggregate into species, such as worm-like or rod-like micelles, which can interact to form a network exhibiting viscous and elastic behavior.

Figure 2:
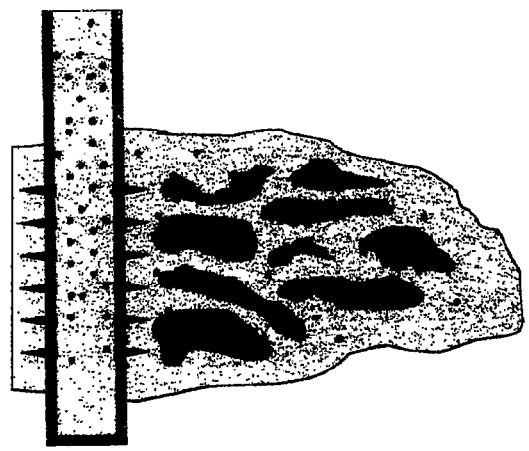
FIG. 2 shows proppant clusters formed in the fracture during implementation of this invention's method.
Figure 3:
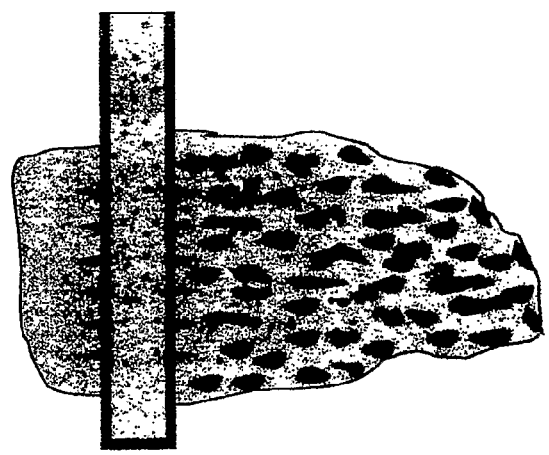
FIG. 3 shows proppant clusters formed in the fracture during implementation of the method according to a second embodiment.

The method's second stage here-and-after referred to as "propped stage" involves the periodical introduction into the fracturing fluid in the form of solid particles or granules to form a suspension. The propped stage is divided into two periodically repeated sub-stages, the "carrier sub-stage" involves injection of the fracturing fluid without proppant; and the "propping sub-stage" involves addition of proppant into the fracturing fluid. As a result of the periodic slugging of slurry containing granular propping materials, the proppant doesn't completely fill the fracture. Rather, spaced proppant clusters form as posts with channels between them through with formation fluids pass, as shown in FIG. 2. The volumes of propping and carrier sub-stages as pumped may be different. That is the volume of the carrier sub-stages may be larger or smaller than the volume of the propping sub-stages. Furthermore the volumes of these sub-stages may change over time. That is, a propping sub-stages pumped early in the treatment may be of a smaller volume then a propping sub-stage pumped latter in the treatment. The relative volume of the sub-stages is selected by the engineer based on how much of the surface area of the fracture he desires to be supported by the clusters of proppant, and how much of the fracture area is open channels through which formation fluids are free to flow.

Reinforcing and/or consolidating material are introduced into the fracture fluid during the propped stage to increase the strength of the proppant clusters formed and prevent their collapse during fracture closure. Typically the reinforcement material is added to the propping sub-stage, but as we see below this may not necessarily be always the case. The concentrations of both propping and the reinforcing materials can vary in time throughout the propping stage, and from sub-stage to sub-stage. That is, the concentration of reinforcing material may be different at two subsequent sub-stages. It may also be suitable in some applications of the present method to introduce the reinforcing material in a continuous fashion throughout the propped stage, both during the carrier and propping sub-stages. In other words, introduction of the reinforcing material isn't limited only to the propping sub-stage. Particularly, different implementations may be preferable when the reinforcing material's concentration doesn't vary during the entire propped stage; monotonically increases during the propped stage; or monotonically decreases during the propped stage.

Curable or partially curable, resin-coated proppant may be used as reinforcing and consolidating material to form proppant clusters. The selection process of the appropriate resin-coated proppant for a particular bottom hole static temperature (BHST), and the particular fracturing fluid are well known to experienced workers. In addition, organic and/or inorganic fibers can reinforce the proppant cluster. These materials can be used in combination with resin-coated proppants or separately. These fibers could be modified to have an adhesive coating alone; or an adhesive coating coated by a layer of non-adhesive substance dissolvable in the fracturing fluid as it passes through the fracture. Fibers made of adhesive material may be used as reinforcing material, coated by a non-adhesive substance that dissolves in the fracturing fluid as it passes through the fracture at the subterranean temperatures. Metallic particles are another preference for reinforcing material and may be produced using aluminum, steel containing special additives that reduce corrosion, and other metals and alloys. The metallic particles may be shaped to resemble a sphere and measure 0.1-4 mm. Preferably, metallic particles are used of an elongated shape with a length longer than 2 mm and a diameter of 10 to 200 microns. Additionally, plates of organic or inorganic substances, ceramics, metals or metal-based alloys may be used as reinforcing material. These plates may be disk or rectangle-shaped and of a length and width such that for all materials the ratio between any two of the three dimensions is greater than 5 to 1.

Both the carrier and propping sub-stages may include introduction of an agent into the fracturing fluid to increase its the proppant transport capability. In other words, reducing the settling rate of proppant in the fracture fluid. The agent may be a material with elongated particles whose length much exceeds their diameter. This material affects the rheological properties and suppresses convection in the fluid, which results in a decrease of the proppant settling rate in the fracture fluid. Materials that may be used include fibers that are organic, inorganic, glass, ceramic, nylon, carbon and metallic. The proppant transport agents may be capable of decomposing in the water-based fracturing fluid or in the downhole fluid, such as fibers made on the basis of polylactic acid, polyglycolic acid, polyvinyl alcohol, and others. The fibers may be coated by or made of a material that becomes adhesive at subterranean formation temperatures. They may be made of adhesive material coated by a non-adhesive substance that dissolves in the fracturing fluid as its passes through the fracture. The fibers used can be no longer than 2 mm with a diameter of 10-200 m, in accordance with the main condition that the ratio between any two of the three dimensions be greater than 5 to 1. The weight concentration of the fibrous material in the fracturing fluid is from 0.1 to 10%.

Proppant choice is critical when using this invention's method and should be chosen with consideration to increasing the proppant clusters strength. A proppant cluster should maintain a reasonable residual thickness at the full fracture closure stress. This method provides an increase in fluid inflow through open channels formed between the proppant clusters. In this situation, a proppant's permeability value, as such, isn't decisive for increasing the well's productivity using this method. Thus, a proppant cluster may be created successfully using sand whose particles are too weak for use in standard hydraulic fracturing in the present formation. Sand costs substantially less than ceramic proppant. Additionally, destruction of sand particles during application of the fracture closure load might improve strength behavior of the same cluster consisting of proppant granules. This can occur because the cracking/destruction of proppant particles decreases the cluster porosity thereby increasing the proppant compactness degree. Sand pumped into the fracture to create proppant clusters doesn't need good granulometric properties, that is, the narrow diameter distribution of particles. For example, to implement the method above, it is possible to use 50 tons of sand, wherein 10 to 15 tons have a diameter of particles from 0.002 to 0.1 mm, 15 to 30 tons have a diameter of particles from 0.2 to 0.6 mm, and 10 to 15 tons have a diameter of particles from 0.005 to 0.05 mm. It should be noted that about 100 tons of a proppant more expensive than sand would be necessary to obtain a similar value of hydraulic conductivity in the created fracture implementing the prior (conventional) method of hydraulic fracturing.

For the purposes of this invention, it may be preferable to use sand with an adhesive coating alone, or an adhesive coating coated by a layer of non-adhesive substance dissolvable in the fracturing fluid as it passes through the fracture. A non-adhesive substance guarantees that particles of the adhesive proppant won't form agglomerates prior to entering the fracture, and allows for control of a time moment (a place) in the fracture when (where) a proppant particle gains its adhesive properties. The adhesive coating is cured at the formation temperature, and sand particles conglutinate between each other. Bonding particles within the clusters reduces the proppant cluster erosion rate as formation fluids flow past the cluster, and minimizes proppant cluster destruction by erosion.

In some cases, the first embodiment of this invention may require that the propping stage be followed by a third stage, here-and-after referred to as the "tail-in stage" involving continuous introduction of an amount of proppant. If employed, the tail-in stage of the fracturing treatment resembles a conventional fracturing treatment, where a continuous bed of well-sorted conventional proppant is placed in the fracture relatively near to the wellbore. The tail-in stage may involve introduction of both an agent that increases the fluid's proppant transport capability and or an agent that acts as a reinforcing material. The tail-in stage is distinguished from the second stage by the continuous placement of a well-sorted proppant, that is, a proppant with an essentially uniform size of particles. The proppant strength is sufficient to prevent its cracking (crumbling) when subjected to stresses that occur at fracture closure. The proppant's role at this stage is to prevent fracture closure and, therefore, to provide good fracture conductivity in proximity to the wellbore. The proppants used in this third stage should have properties similar to conventional proppants.

Second Embodiment

The hydraulic fracturing method in this embodiment introduces one or more agents into the treatment fluid to promote the formation of proppant clusters in the fracture during pumping, while continuously pumping propping agents. When the agent reacts it causes the local formation of a proppant cluster. Typically the agent is selected or designed such that its action or function is delayed until it is placed within the fracture. Delaying chemical and or physical reaction is a process commonly used in hydraulic fracturing as well as many other industrial processes. One process that can be used is the simple temperature activation of the agent as the fracturing fluid heats up as it enters the higher temperature formation deep in the earth. For example, ammonium persulfate homolysis is relatively slow at surface temperatures of 20 degC, but relatively rapid at formation temperatures of 100 degC. A second processes is slow dissolution of a reactive agent, or of a binder. For example, the dissolution ratio of polyvinyl alcohol in water is dependant on its molecular weight. Encapsulation of a reactive species is a common process employed in hydraulic fracturing. The reactive material or agent is protected for a time from the fracturing fluid by a relatively non-reactive capsule. The encapsulated material subsequently releases the reactive agent, either slowly or quickly by many different methods. The encapsulation can be designed to release its contents by dissolution, mechanical erosion, crushing swelling and rupturing, or simply by slow diffusion. Examples of release mechanisms for controlled chemical delivery are described in many patents and publications. (U.S. Pat. Nos. 5,658,861; 4,657,784; 5,716,923; 5,505,740; 5,910,322).

This embodiment of the invention involves several steps. The first stage of the fracturing treatment, the "pad stage" is pumped as usual. Unlike the previous embodiment where proppants were pumped discontinuously, in this embodiment the proppant (propping agents) are pumped continuously. The proppant's concentration may increase, stay constant, or decrease during the propped stage. Normally proppant concentrations start low, and are ramped up to higher concentrations near the end of the treatment. The key to this embodiment is that an agent causes the nucleation or formation of proppant clusters is discontinuously or periodically introduced into the fracturing fluid during the propped stage. The agent is designed to work in only a small region or zone within the fracture. Propping materials within this zone are influenced in such a way that they form cluster, bridge out and become immobile. In addition proppants that are pumped subsequent to the cluster formation may accumulate on the cluster and make it grow in size.

Figure 1:
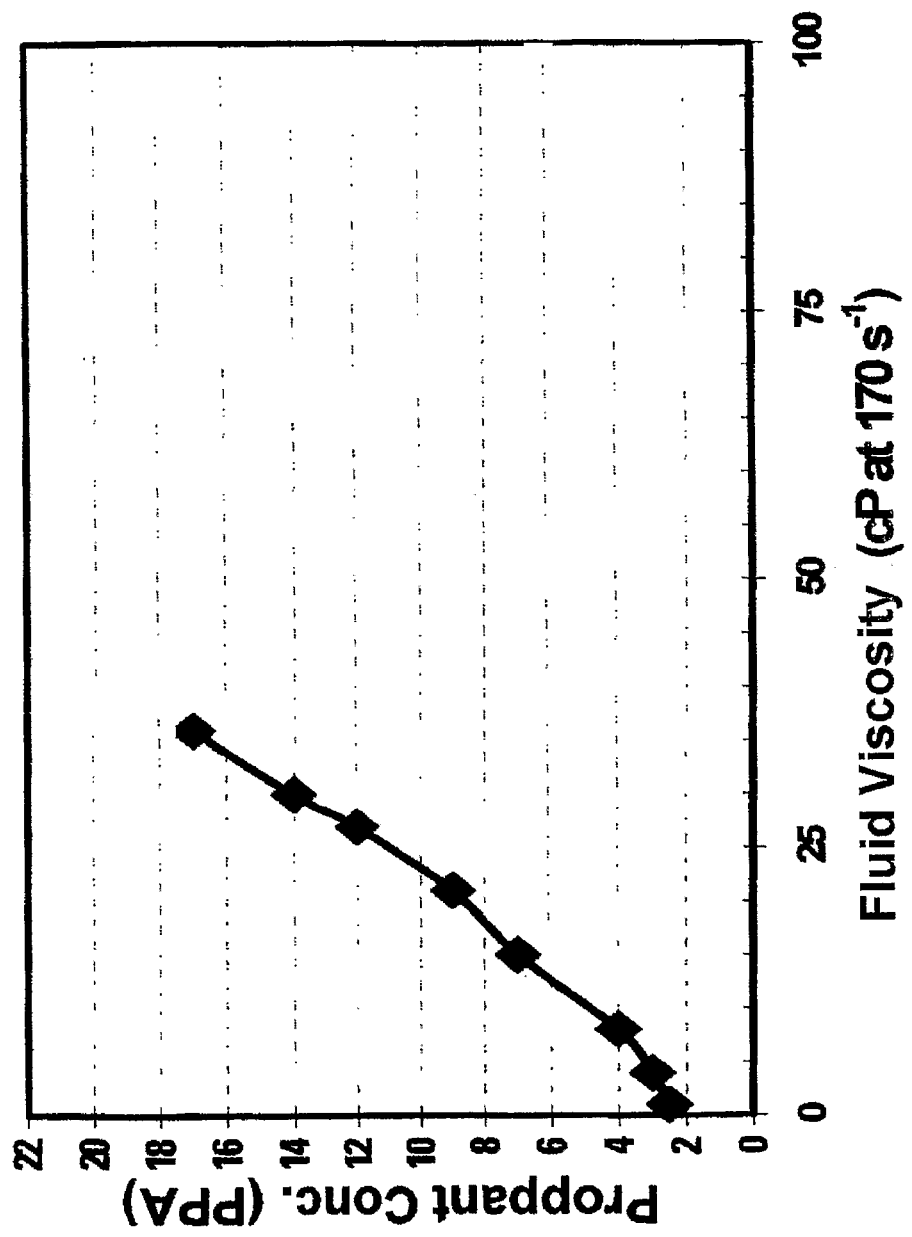
FIG. 1 shows fracturing fluid viscosity against proppant concentration.

One way to practice this invention is to generate clusters of proppant is by locally reducing the fluids ability to transport solid phase particles. In this case the agent could be a high concentration of oxidative "breakers", such as ammonium persulfate, that—when reacting with the fracturing fluid at different places in the fracture—lead to drastic and significant decreases in the fracturing fluid's local viscosity. When fluid viscosity drops below a critical value, the fracturing fluid is unable to transfer the proppant particles—The particles stop, settle, and form proppant clusters. The addition of fibers greatly enhances proppant cluster formation. FIG. 1 shows the critical viscosity of the fracturing fluid against the proppant concentration. Encapsulated breakers with a long release time can be used at the beginning of the propped stage, and encapsulated breakers with short release times can be used at the end of the propped stage.

Reinforcing materials such as fibers can greatly increase the tendency of proppants to locally jam between the fracture walls and form a cluster. Therefore, in this embodiment fibers and or other reinforcing materials as discussed above may be added to the fracturing fluid during the propped stage either continuously into or discontinuously (at the same time as the breaker).

Requirements for proppant properties used in the first embodiment apply in the second one as well. It's possible to use a proppant without a narrow diameter distribution of particles, that is, a poorly-sorted proppant with a relatively small strength value per particle. For instance, there may be sand particles with coatings similar to that described in the first embodiment of the method. The above-mentioned third stage may also take place.

Chemical species that competitively bind the crosslinking agents could be another type of agent used to locally reduce fluid viscosity. The local release of chelants, (that react with zirconate crosslinkers), sorbitol or polyvinylalcohol (that react with borate crosslinkers) or other species that deactivate the crosslinker can cause the polymer gel to de-crosslink and significantly reduce the fracturing fluid viscosity. Since many crosslinking reactions are pH dependent, the localized release of an acid or base can also reduce fluid viscosity. For example, one may manipulate the fracturing fluid pH through the introduction of an encapsulated acid and/or particles of substances, for instance polylactic acid or polyglycolic acid in which release or generation of the acid occurs at a controlled rate. Changing the fracturing fluid pH reduces the crosslinker affinity to form stable bonds with the polymer and the fluid viscosity decreases for certain specific polymer crosslinker combinations.

For said purposes, an encapsulated absorbent or competitive chelating agent of the polymer chain cross-linker may be used also, which allows for controlled release. Crosslinked gel chemicals, such as sodium gluconate or sorbitol, may be used for a borate. For metal crosslinkers, such as titanates or zirconates, chemicals including but not limited to EDTA, NTA, phosphates, polyvinyl acetates may be used. Selection of the specific chemical to attack the crosslinker in question are well known to skilled workers and the can be assisted by references such as, R. M. Smith and A. E. Martell, "Critical Stability Constants", Vol. 1-6, Plenum Press, New York, 1974, 1975, 1976, 1977, 1982 and 1989. Such absorbents may be, for instance, phosphates or polyvinyl acetates.

The agent that provides proppant cluster formation by decreasing the fracturing fluid's local viscosity may also represent chemical substances that react with the fracturing fluid to provide a significant amount of local heat extraction, resulting in heating the fracturing fluid and thereby decreasing its local viscosity. Examples of such substances include explosives or encapsulated reactive metals such as sodium, that release the substance in various places in the fracture to provide proppant cluster formation throughout the length of the fracture. (Patent Application US2004/0226715 A1: Willberg, Desroches, et, al)

The Third Embodiment

The third embodiment is directed to formation of proppant clusters and channels between them by reducing proppant mobility in the fracture. This method involves first and second stages similar to the second embodiment, but differs in that the agents that produce cluster formations decrease mobility of proppant particles.

These additives may be fiber bundles that slowly expand and shed individual fibers due to mechanical agitation. The increased excluded volume of the bundle, and the localized increase in fiber concentration can initiate jams and create of proppant clusters.

The additives may be also be cut wires made of an alloy possessing "shape memory" properties. For example Copper-Aluminum-Nickel (CuAlNi) shape memory alloys function over the temperature range of many oil and gas-bearing formations. These materials may be bent to shape small balls (springs) and retain their shape at surface temperature. When heated to reservoir temperature, the material with "shape memory" undergoes phase transition accompanied by recovery of its original memorized straight-line shape. Phase transition temperature variation is possible by varying the alloy composition. It may be preferable to introduce a material whose phase transition temperature varies from portion to portion. At the beginning of the propped stage, for instance, it may be reasonable to introduce materials with the highest phase transition temperature, for example, slightly less than the formation temperature; and at the end of the second stage in may be reasonable to introduce a material having the lowest phase transition temperature, for example, slightly more than the surface fluid temperature. Balls of the material with "shape memory" are usually similar in size to proppant particles (K. Otsuka, C. M. Wayman, Shape memory materials, Cambridge University press, 1999; EP 0360319 A1; U.S. Pat. No. 5,040,283; U.S. Pat. No. 5,057,114; U.S. Pat. No. 6,752,208; U.S. Pat. No. 4,980,960; U.S. Pat. No. 4,619,320).

When the metal balls are subjected to an elevated temperature in the fracture, they recover their original shape, that is, they straighten. As noted above, local increase of their contents effectively promotes formation of proppant clusters in the fracture. The ability to vary the shape recovery temperature gradually by varying the alloy composition allows formation of wires and thereby immovable clusters of proppant distributed uniformly throughout the length of the fracture.

Implementation of this method in its third embodiment may also stipulate the use of super-absorbing material to form local jams in the flowing fracturing fluid. Super-absorbents such as crosslinked polyacrylamide polyacrylate copolymers can adsorb an amount of water 100 to 300 times their weight in water. A wide variety of super-absorbents are available. Selection of a particular one for the present method is determined by such factors as formation temperature, salt content of the water used to prepare the fracturing fluid, and others.

Preferable for use in the present method is a super-absorbent protected by a shell or emulsion that is dissolved or dispersed at its passes through the fracture or upon elevation of the fracturing fluid temperature, or a combination of these conditions. By varying shell thickness, it is possible to control the time span between introduction of a portion of the super-absorbent into the fracturing fluid and its release from the shell. When the shell dissolves or is dispersed, an absorbing particle begins its growth by absorbing water from its surroundings. Increasing the mass and size of particles decelerates their movement through the fracture and ultimately results in local jams, capture of proppant particles, and formation of proppant clusters.

In the third embodiment of the method, additives used to decrease proppant mobility in the fracture may be granules, fibers, or plates whose surface becomes "adhesive" at formation temperatures. To practice this method, additional coating of particles with adhesive surfaces with a layer of a non-adhesive substance dissolvable in the fracturing fluid may be preferable; by varying the substance thickness, the time span can be varied whose lapse gives rise to formation of proppant clusters due to their surface adhesive properties. Another technique for controlling time span employs coatings that gain adhesive properties at different temperatures. To apply the present technique, it may be preferable to introduce particles with a maximum thickness of protective coating (thus with a maximum temperature of demonstrating "adhesive" properties) at the beginning of the second stage. And be preferable to introduce respectively particles with a minimum thickness of a protective coating (thus with a minimum temperature of demonstrating "adhesive" properties) at the end of the second stage. When such particles enter the fracture, they collide (bump) and conglutinate forming agglomerates of proppant particles. When the agglomerates size become comparable with the characteristic width of the fracture, they wedge between the fracture faces causing local proppant jams and formation of proppant clusters.

As in previous embodiments of the method, this one may include introducing reinforcing materials into the fracturing fluid, thus increasing the strength of the formed proppant clusters; and introducing agents that increase the fluid's proppant transport ability by decreasing the proppant settling rate through the fracturing fluid. All these requirements for proppant selection, particularly for use of a proppant that is relatively moderately strong, a (possibly) wide distribution of particle sizes, the proppant coated preliminarily with a binder layer curable under formation conditions, remain applicable in the present embodiment of the method. The above-mentioned third stage of the method is also possible.

The Fourth Embodiment

The fourth embodiment of the hydraulic fracturing method is directed at formation of proppant clusters and channels between them by sequentially pumping two fluids with contrasting viscosities into the borehole. This method involves a first stage similar to that in the above-mentioned embodiments, and a second stage that involves continuous introduction of proppant into a given fluid.

Similar to the previous embodiments, the second stage may involve introducing reinforcing materials into the fracturing fluid, these materials increasing the strength of the formed proppant clusters; and introducing an agent that increases the fluid's proppant transport ability by decreasing the proppants settling rate. All requirements for proppant selection, particularly the use of a proppant with a relatively moderate strength, a wide size distribution of particles, and preliminarily coated with a binder layer curable under formation conditions, are still applicable in the present embodiment.

Figure 4:
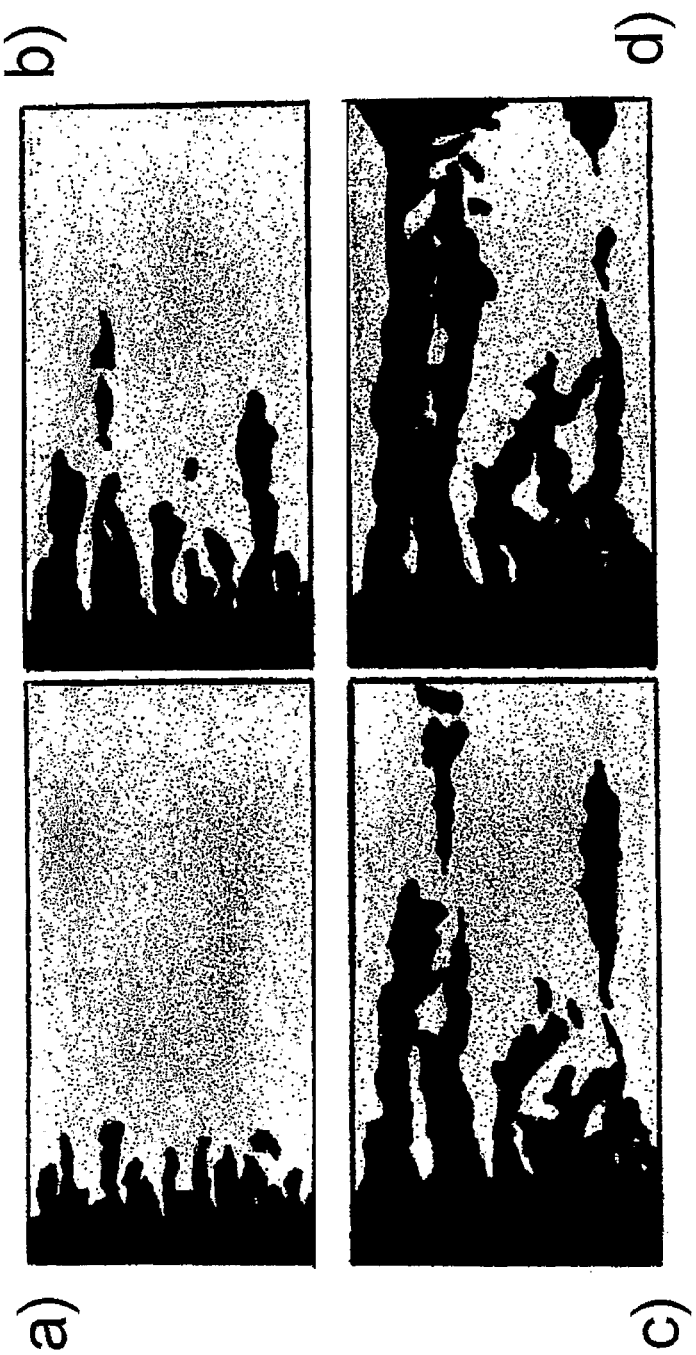
FIG. 4 shows proppant clusters formed in the fracture during implementation of the method according to a third embodiment (from a) to d) in process), wherein formation of viscous fingers occurs while displacing a thicker fluid with a thinner one. Shown on the picture is a result of numerical simulation. Showed in grey color is a thick fluid with proppant. Showed in black is a thin fluid which fingers through the proppant pack and creates open channels in a pack. Stability of channels formed may be increased if thicker fluid has a yield stress.

The third stage of the present method terminates injection of proppant-containing fracturing fluid together with other materials, and instead injects a fluid of very low viscosity into the created fracture. Owing to the difference between their viscosities, injection of the lower-viscosity fluid after injection of the more viscous fluid results in penetrating the lower-viscosity fluid into the more viscous fluid in the form of "intrusions". This forms channels in the proppant that fills the fracture dividing the proppant into discrete clusters, as shown in FIG. 4. In the embodiment of FIG. 4, the ratio of fluid viscosities is 80.

As in the previous embodiments, the present method may include a fourth "tail-in" stage involving continuous introduction of a proppant with essentially uniform particle size, a reinforcing material, and/or a material with elongated particles that increase the proppant transport ability of the fracturing fluid into the fluid.

All methods for hydraulic fracturing described above and with different mechanisms to form proppant clusters provide very high hydraulic fracture conductivity. This occurs through the formation of strong proppant clusters well spaced throughout the fracture's length and height. The clusters are stable enough to prevent the fracture from closing; and the inter-cluster channels have a sufficiently large cross-section for formation fluids to flow.

The invention claimed is:

1. A method for hydraulic fracturing of subterranean formation comprising:
    a first stage comprising injection of fracturing fluid into a borehole, the fluid containing thickeners to create a fracture in the formation;
    a second stage comprising introduction of proppant into the injected fracturing fluid to prevent closure of the created fracture, and further, comprising introducing an agent into the fracturing fluid in addition to the proppant to provide formation of proppant clusters in the created fracture and channels for flowing formation fluids; and
    a third stage comprising continuously introducing a proppant into the fracturing fluid, the proppant having an essentially uniform size of particles.

2. The method as stated in claim 1, wherein introducing the agent comprises introducing a reinforcing or consolidation material or both.

3. The method as stated in claim 2, wherein the reinforcing or consolidating material or both are selected from organic, inorganic, or organic and inorganic fibers with an adhesive coating alone or an adhesive coating coated by a layer of non-adhesive substance dissolvable in the fracturing fluid during its passage through the fracture; metallic particles of spherical or elongated shape; plates of organic or inorganic substances, ceramics, metals or metal alloys with the ratio between any two of the three dimensions greater than 5 to 1.

4. The method as stated in claim 3, wherein the second stage further involves introducing another agent into the fracturing fluid, this agent increasing the proppant transport capability of the fluid.

5. The method as stated in claim 4, wherein the agent is a material with elongated particles with the ratio between any two of the three dimensions greater than 5 to 1.

6. The method as stated in claim 5, wherein the material with elongated particles is introduced when the proppant is not introduced into the fracturing fluid, or continuously.

7. The method as stated in claim 6, wherein the elongated particles are fibers made from naturally occurring or synthetic organic materials, or glass, ceramic, carbon, inorganic or metallic fibers.

8. The method as stated in claim 7, characterized by fibers made on the basis of polylactic acid, polyglycolic acid, polyethylene terephthalate (PET), their copolymers and polyvinylalcohol.

9. The method as stated in claim 7, characterized by fibers coated by, or made of, a material that becomes adhesive at formation temperatures.

10. The method as stated in claim 7, characterized by fibers made of adhesive material coated by a non-adhesive substance that dissolves in the fracturing fluid as it passes through the fracture.

11. The method as stated in claim 1, characterized by the volume of injection of proppant-containing fracturing fluid is less than the volume of injection of fluid containing no proppant to create smaller proppant clusters and larger channels between them for formation fluids to pass.

12. The method as stated in claim 1, characterized by the proppant comprising a mixture of material fractions with different particle diameters, a diameter ratio of particles in each fraction, and a relative amount of each fraction being selected, to minimize the resulting porosity of the proppant cluster or islands.

13. The method as stated in claim 12, characterized by particles of the proppant having a resinous or adhesive coating alone, or a resinous or adhesive coating coated by a layer of non-adhesive substance dissolvable in the fracturing fluid as it passes through the fracture.

14. The method as stated in claim 1, characterized by the third stage comprising continuously introducing a reinforcing material, consolidation material, or both, into the fracturing fluid.

15. The method as stated in claim 14, characterized by the third stage continuously introducing a material into the fracturing fluid, the material having elongated particles that increase the proppant transport capability of the fluid.

16. A method for hydraulic fracturing of subterranean formation comprising:
   a first stage comprising injection of fracturing fluid into a borehole, the fluid containing thickeners to create a fracture in the formation; and
   a second stage comprising continuous introduction of proppant into the injected fracturing fluid to prevent closure of the created fracture, and further, comprising introducing an agent into the fracturing fluid in addition to the proppant to provide formation of proppant clusters in the created fracture and channels for flowing formation fluids.

17. The method as stated in claim 16, characterized by the volume of injection of proppant-containing fracturing fluid is less than the volume of injection of fluid containing no proppant to create smaller proppant clusters and larger channels between them for formation fluids to pass.

18. A method for hydraulic fracturing of subterranean formation comprising:
   a first stage comprising injection of fracturing fluid into a borehole, the fluid containing thickeners to create a fracture in the formation; and
   a second stage comprising continuous introduction of proppant into the injected fracturing fluid to supply the proppant into the injected fracturing fluid to prevent closure of the created fracture, and
   a third stage that involves injection of a lower-viscosity fluid, in comparison to the fracturing fluid, into the fracturing fluid, owing to the difference in viscosity compared to the fracturing fluid, penetrating into the fracturing fluid in the form of intrusions that divide the proppant into discrete clusters to form channels between them through which fluid formations to pass.

19. The method as stated in claim 18, characterized by the volume of injection of proppant-containing fracturing fluid is less than the volume of injection of fluid containing no proppant to create smaller proppant clusters and larger channels between them for formation fluids to pass.

* * * * *